United States Patent
Lee et al.

(10) Patent No.: US 10,401,983 B2
(45) Date of Patent: Sep. 3, 2019

(54) METHOD FOR A DISPLAY OF AN ELECTRONIC DEVICE AND THE ELECTRONIC DEVICE

(71) Applicant: Samsung Electronics Co., Ltd., Gyeonggi-do (KR)

(72) Inventors: Eunhye Lee, Seoul (KR); Jinyung Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 300 days.

(21) Appl. No.: 15/130,341

(22) Filed: Apr. 15, 2016

(65) Prior Publication Data
US 2016/0306442 A1    Oct. 20, 2016

(30) Foreign Application Priority Data

Apr. 17, 2015  (KR) .................... 10-2015-0054670

(51) Int. Cl.
| | |
|---|---|
| *G06F 3/0362* | (2013.01) |
| *G06F 3/0482* | (2013.01) |
| *G06F 1/16* | (2006.01) |
| *G06F 3/0484* | (2013.01) |
| *G04G 9/00* | (2006.01) |
| *G04G 21/02* | (2010.01) |

(52) U.S. Cl.
CPC ......... *G06F 3/0362* (2013.01); *G04G 9/0064* (2013.01); *G04G 21/02* (2013.01); *G06F 1/163* (2013.01); *G06F 3/0482* (2013.01); *G06F 3/04847* (2013.01)

(58) Field of Classification Search
CPC ...... G06F 3/0362; G06F 1/163; G06F 3/0482; G06F 3/04847; G04G 9/0064; G04G 21/02
See application file for complete search history.

(56) References Cited

U.S. PATENT DOCUMENTS

| | | | |
|---|---|---|---|
| 6,809,724 B1 * | 10/2004 | Shiraishi ................ | G06F 1/163 345/157 |
| 7,113,450 B2 | 9/2006 | Plancon et al. | |
| 7,215,601 B2 | 5/2007 | Plancon et al. | |
| 7,371,214 B2 | 5/2008 | Kouchi et al. | |
| 7,534,206 B1 | 5/2009 | Lovitt et al. | |
| 7,853,428 B2 | 12/2010 | Usui et al. | |
| 7,860,536 B2 | 12/2010 | Jobs et al. | |
| 8,436,810 B2 | 5/2013 | Langereis et al. | |

(Continued)

FOREIGN PATENT DOCUMENTS

| | | |
|---|---|---|
| KR | 1020060016946 | 2/2006 |
| KR | 1020060063102 | 6/2006 |

(Continued)

*Primary Examiner* — Sejoon Ahn
(74) *Attorney, Agent, or Firm* — The Farrell Law Firm, P.C.

(57) ABSTRACT

An electronic device and a screen display method thereof are described. In one aspect, a display is configured to display a screen that includes an information area, an item area disposed at the edge of the information area, and a pointer configured to point within the item area, where the item area is configured to display at least one event item, and a controller is configured to control the display to move the pointer based on a rotation input and to display event information of an event item to which the pointer points, in the information area.

15 Claims, 19 Drawing Sheets

(56) References Cited

U.S. PATENT DOCUMENTS

| | | | |
|---|---|---|---|
| 8,610,582 B2 | 12/2013 | Jeon et al. | |
| 8,627,220 B2* | 1/2014 | Fyke | G06F 3/03547 345/204 |
| 8,831,407 B2 | 9/2014 | Meschter et al. | |
| 2003/0066032 A1* | 4/2003 | Ramachandran | G06F 3/04847 715/234 |
| 2003/0071855 A1* | 4/2003 | Kim | G06F 3/03547 715/810 |
| 2003/0135292 A1* | 7/2003 | Husgafvel | G06F 3/0219 700/83 |
| 2004/0021702 A1* | 2/2004 | Lucaci | G06F 1/1626 715/864 |
| 2005/0116941 A1* | 6/2005 | Wallington | G06F 3/0362 345/184 |
| 2005/0165920 A1* | 7/2005 | Kerr | G06F 3/0481 709/223 |
| 2005/0268251 A1* | 12/2005 | Bennetts | G06F 3/0362 715/810 |
| 2006/0177136 A1* | 8/2006 | Windl | G06F 3/04847 382/189 |
| 2006/0184966 A1* | 8/2006 | Hunleth | G06F 3/017 725/39 |
| 2009/0027337 A1* | 1/2009 | Hildreth | G06F 3/011 345/158 |
| 2009/0077497 A1* | 3/2009 | Cho | G06F 3/04817 715/814 |
| 2009/0244003 A1* | 10/2009 | Bonnat | G06F 3/011 345/157 |
| 2010/0026699 A1* | 2/2010 | Huang | G06F 1/1601 345/581 |
| 2010/0169831 A1* | 7/2010 | Lu | G06F 3/0482 715/810 |
| 2011/0105193 A1* | 5/2011 | Lee | G06F 3/0488 455/566 |
| 2013/0083029 A1 | 4/2013 | Vadlamudi | |
| 2013/0091472 A1 | 4/2013 | Terai | |
| 2014/0347289 A1* | 11/2014 | Suh | G06F 3/017 345/173 |
| 2016/0034133 A1* | 2/2016 | Wilson | G06F 3/0488 715/772 |

FOREIGN PATENT DOCUMENTS

| | | |
|---|---|---|
| KR | 1020130105677 | 9/2013 |
| KR | 1020130111569 | 10/2013 |
| KR | 1020140137170 | 12/2014 |
| WO | WO 2012/061438 | 5/2012 |

* cited by examiner

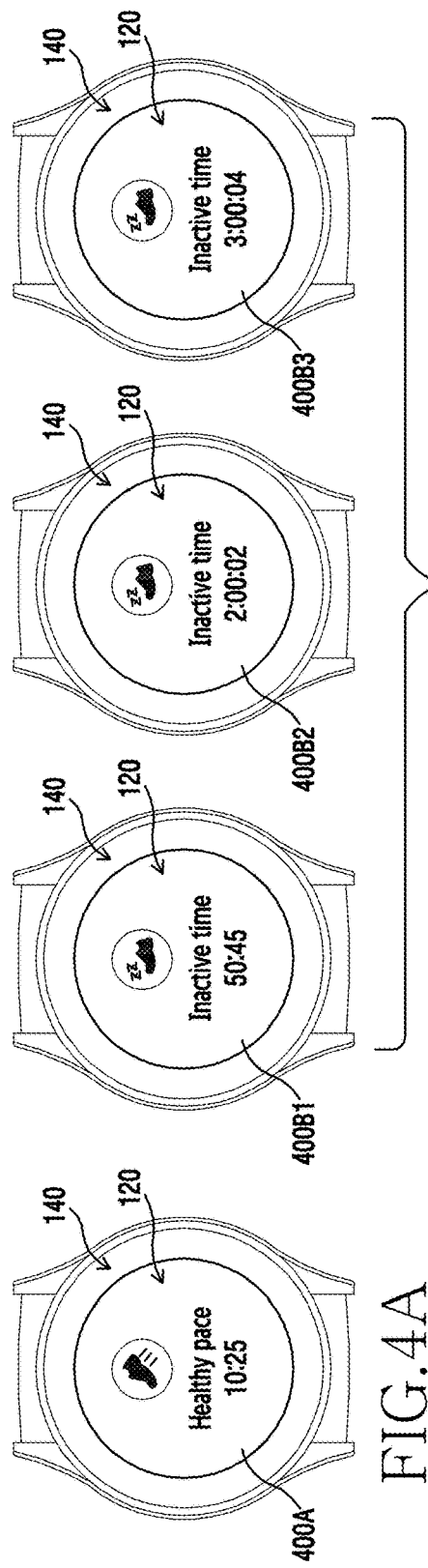
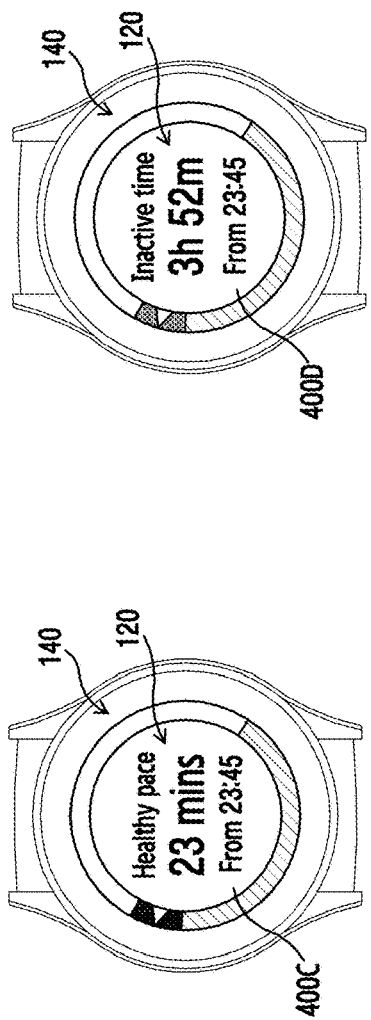
FIG.4A FIG.4B FIG.4C FIG.4D

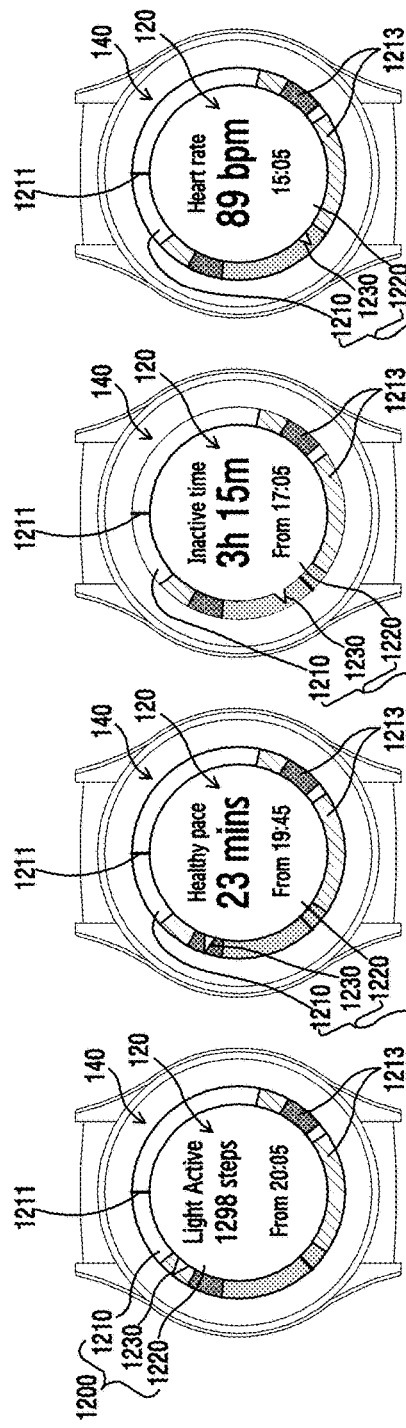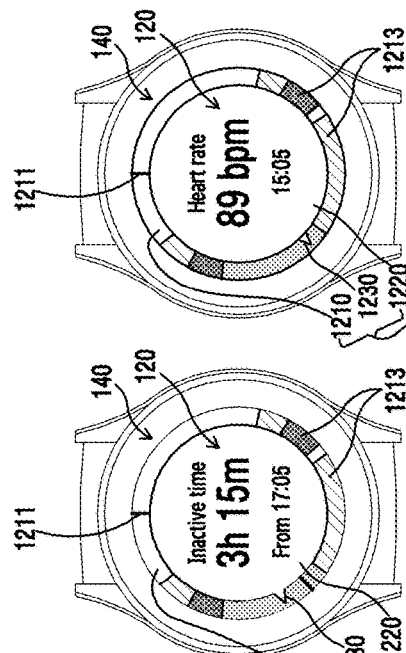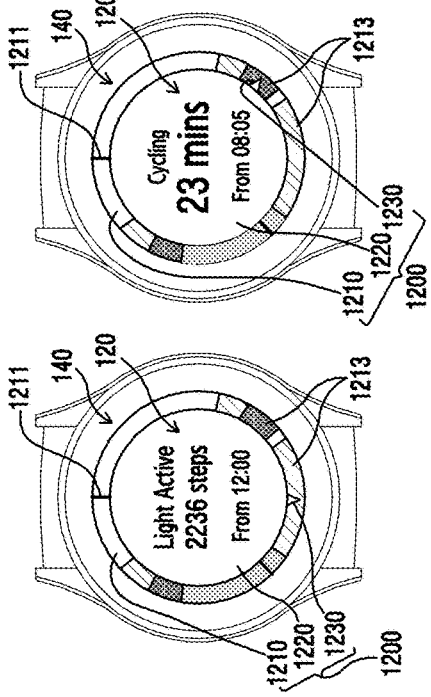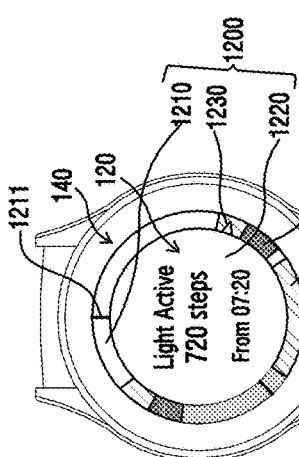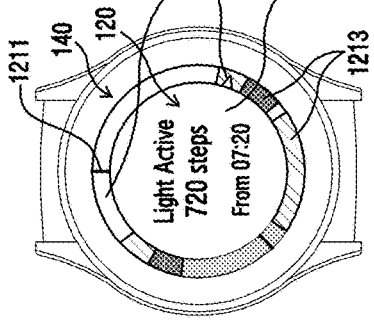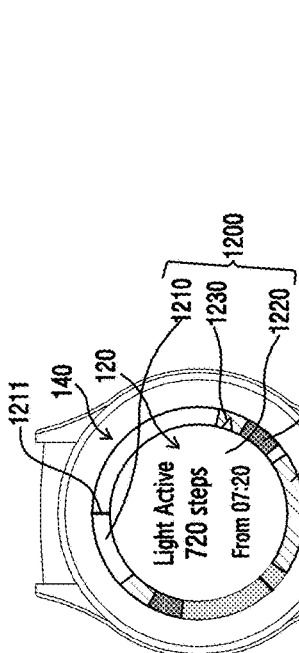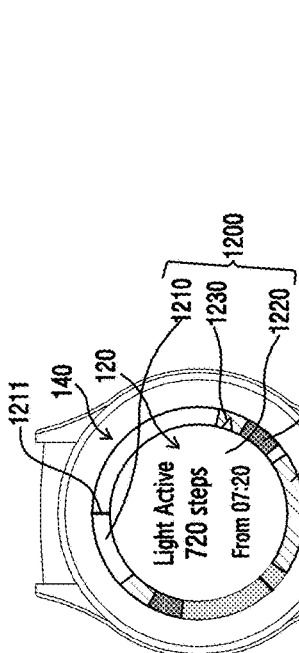

METHOD FOR A DISPLAY OF AN ELECTRONIC DEVICE AND THE ELECTRONIC DEVICE

PRIORITY

This application claims priority under 35 U.S.C. § 119(a) to Korean Patent Application Serial No. 10-2015-0054670, which was filed in the Korean Intellectual Property Office on Apr. 17, 2015, the entire content of which is incorporated herein by reference.

BACKGROUND

1. Field of the Disclosure

The present disclosure relates generally to an electronic device and an operating method thereof and, more specifically, to an electronic device having a display unit and a display method thereof.

2. Description of the Related Art

In general, electronic devices have various functions which may be added and performed in combination. For example, electronic devices may perform mobile communication functions, data communication functions, image photographing functions, audio recording functions, etc. These electronic devices store and manage a large amount of data. For instance, the electronic devices may search for, and display, data. The electronic devices include display units, and may display data on the display units thereof.

However, electronic devices have limitations on the amount of data which can be displayed on the display units thereof. Due to this, users of the electronic devices have difficulty in identifying correlations between data. The problem becomes more serious as the display units are made more compact. Because of this, the efficiency and convenience of the electronic devices may be degraded for the user.

SUMMARY

According to an aspect of the present disclosure, a method for a display of an electronic device is provided, which includes displaying a screen that includes an information area, an item area disposed at the edge of the information area, and a pointer configured to point within the item area, wherein the item area is configured to display at least one event item; moving the pointer based on a rotation input; and displaying event information of an event item to which the pointer points, in the information area.

According to an aspect of the present disclosure, an electronic device includes a display configured to display a screen that includes an information area, an item area disposed at the edge of the information area, and a pointer configured to point within the item area, wherein the item area is configured to display at least one event item; a rotary unit configured to receive a rotation input; and a controller configured to control the display to move the pointer when a rotation input is detected and to display event information of an event item in the information area when the pointer points to the event item.

BRIEF DESCRIPTION OF THE DRAWINGS

The above and other aspects, features, and advantages of the present disclosure will be more apparent from the following detailed description taken in conjunction with the accompanying drawings, in which:

FIGS. 4A-4D illustrate examples of data display screens which may be displayed on a watch-like electronic device according to the embodiment of the present disclosure;

FIGS. 11 to 19C illustrate examples of screen displays which may be generated during event management methods according to embodiments of the present disclosure.

DETAILED DESCRIPTION OF EMBODIMENTS OF THE PRESENT DISCLOSURE

Figure 1:
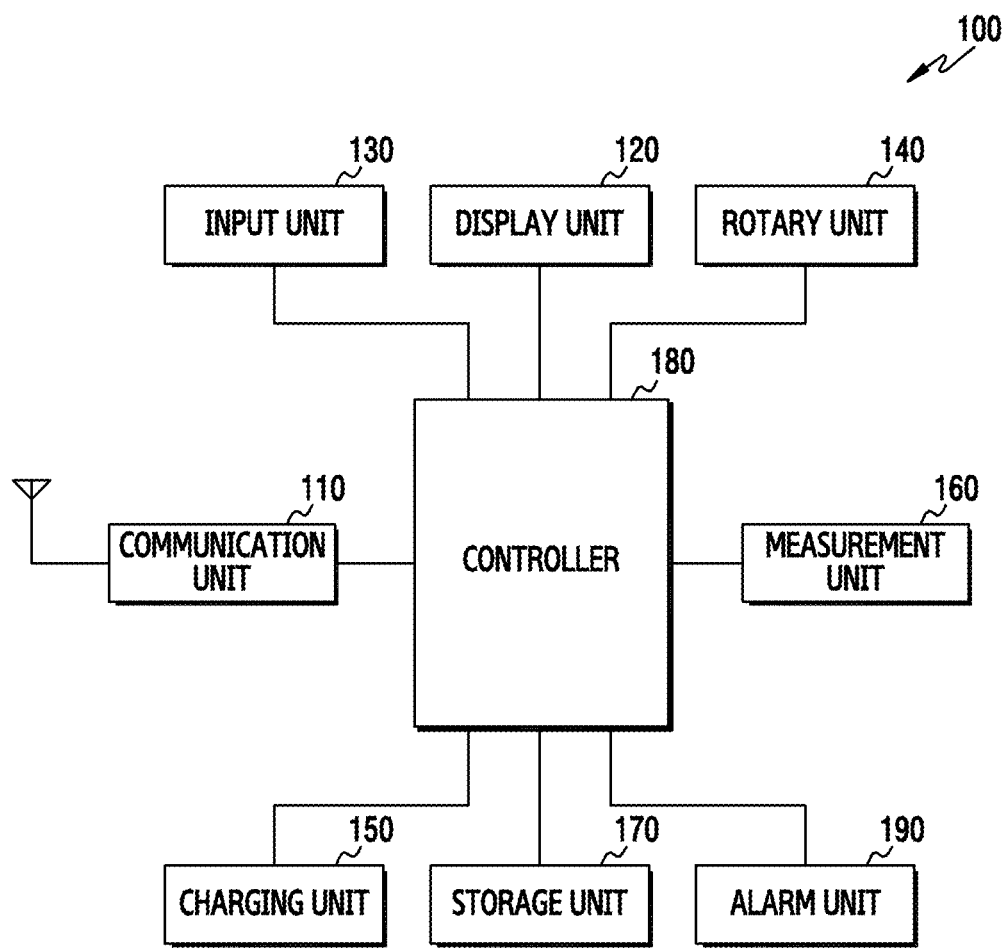
FIG. 1 is a block diagram of an electronic device according to an embodiment of the present disclosure.

Hereinafter, embodiments of the present disclosure will be described in more detail with reference to the accompanying drawings. Herein, identical reference numerals denote the same elements in different drawings, and similar reference numerals may designate similar elements. Detailed descriptions of known functions and structures are omitted herein to avoid obfuscating the subject matter of the present disclosure.

In the following description, the term "event" represents the occurrence of an operation in an electronic device. An event may be, for example, a communication event, an input event, and/or a measurement event. A communication event may be generated by communication with an external device. An input event may be generated by a user input in the electronic device. A measurement event may be generated in response to a change in the surrounding environment of the electronic device. Event data may be generated in response to an event. An "event item" represents a subject/object related to an event and may be used for distinguishing between events. An event item may be at least one of an image, a text, a color, a figure, an icon, and an emoticon. Further, the term "event information" represents basic information corresponding to an event. The event information may be extracted from event data generated in response to the event.

The electronic device and the screen display method, according to embodiments of the present disclosure, display event items of events, which are generated within a predetermined time period, according to the time of the events on an event management screen. Moreover, the electronic device can simultaneously display a large number of event items. This enables a user of the electronic device to more easily identify multiple events.

Furthermore, according to the embodiments of the present disclosure, a user can move a pointer between event items on a display of an electronic device according to a rotation input. Due to this, a user of the electronic device can easily manage events on a display screen. In some embodiments, the electronic device includes a rotary unit for rotation input so that the user of the electronic device can easily control an event management screen. Accordingly, even though the display is implemented in a small size in the electronic device, the user of the electronic device can easily control the event management screen using the rotary unit.

Therefore, the efficiency and convenience of the electronic device can be enhanced for the user.

Figure 2:
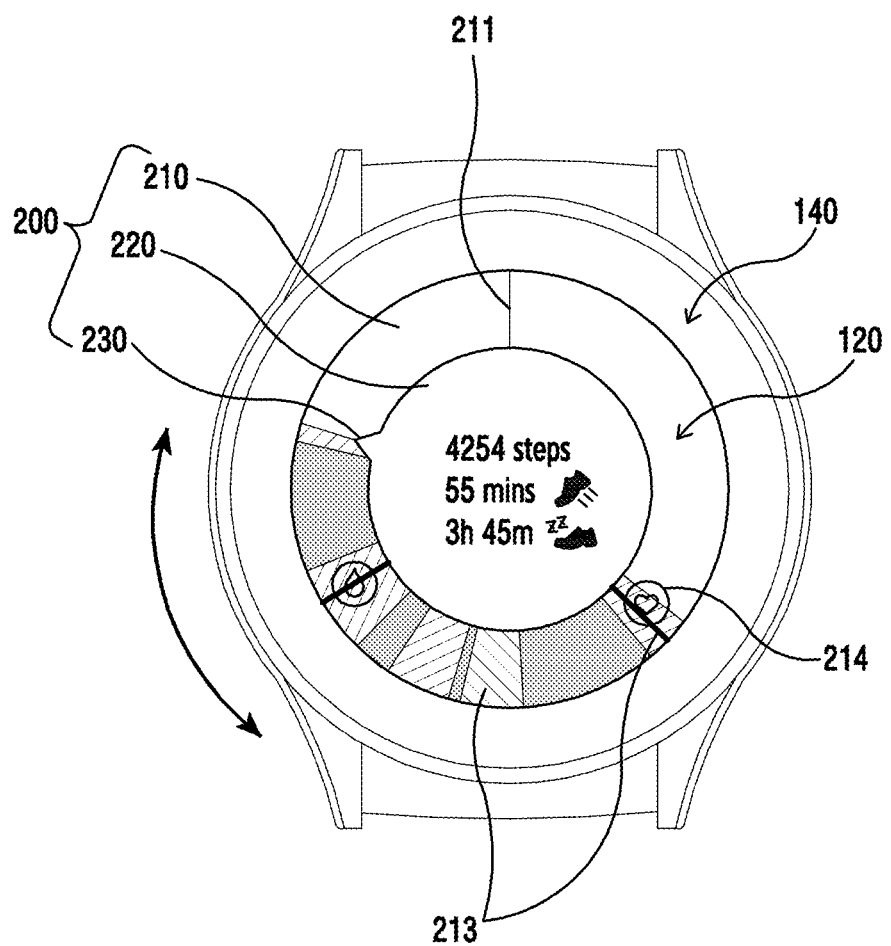
FIG. 2 illustrates an example of an electronic device implemented according to an embodiment of the present disclosure.

FIG. 1 is a block diagram of an electronic device according to an embodiment of the present disclosure, while FIG. 2 illustrates an example of an electronic device implemented according to the embodiment of the present disclosure. The following description is given assuming that the electronic device is a watch-type wearable device, but the electronic devices according to the present disclosure is not limited thereto.

Referring to FIG. 1, the electronic device 100, according to the embodiment of the present disclosure, includes a communication unit 110, a display unit 120 (hereinafter, display units may be also referred to as "displays"), an input unit 130, a rotary unit 140, a charging unit 150, a measurement unit 160, a storage unit 170 (hereinafter, storage units may also be referred to as "storage(s)"), a controller 180, and an alarm unit 190.

The communication unit 110 performs communication in the electronic device 100. In this case, the communication unit 110 communicates with an external device in various communication schemes. For example, the external device may include an electronic device, a base station, a server, and a satellite. The communication unit 110 performs at least one of wireless communication and wired communication. To this end, the communication unit 110 may access at least one of a mobile communication network and a data communication network. The communication unit 110 may also perform short range communication. The communication schemes/protocols may include Long Term Evolution (LTE), LTE-A (LTE Advanced), Wideband Code Division Multiple Access (WCDMA), Global System for Mobile Communication (GSM), Wi-Fi, Bluetooth, and Near Field Communication (NFC).

The display unit 120 outputs display data in the electronic device 100. The display unit 120 may include a Liquid Crystal Display (LCD), a Light Emitting Diode (LED) display, an Organic LED (OLED) display, a Micro Electro Mechanical System (MEMS) display, and/or an electronic paper display. The display unit 120 may be implemented in various shapes. In FIG. 2, the display is implemented in a circular shape.

The input unit 130 generates input data in the electronic device 100. In this case, the input unit 130 may generate the input data in response to a user input of the electronic device 100. The input unit 130 includes at least one input means. The input unit 130 may include a key pad, a dome switch, a physical button, a touch panel, a jog & shuttle, and/or a sensor. The input unit 130, together with the display unit 120, may be implemented as a touch screen.

The rotary unit 140 generates rotation input data in the electronic device 100. In this case, the rotary unit 140 may generate the rotation input data in response to a user input of the electronic device 100. The rotary unit 140 is rotatably fastened to the edge of the display unit 120. The rotary unit 140 may be implemented in various shapes. For example, the rotary unit 140 may be implemented in the shape of a ring which surrounds the display of a watch-type electronic device, as illustrated in FIG. 2. The rotary unit 140 may rotate about the central axis of the display in the clockwise or counterclockwise direction. Alternatively, the rotary unit 140 may be implemented in the shape of a circular cylinder. For example, the rotary unit 140 may be implemented in a shape similar to the crown of an analog watch. In particular, part of the rotary unit 140 may be disposed inside the electronic device 100, and another part of the rotary part 140 may protrude to the outside of the electronic device 100. Like a crown, the rotary unit 140 would rotate about a vertical axis perpendicular to the central axis of the display unit 120 in the clockwise or counterclockwise direction. In addition, the rotary unit 140 may generate pressure (squeeze) input data. In this case, the rotary unit 140 may generate the pressure input data in response to a user input of the electronic device 100.

The charging unit 150 supplies power in the electronic device 100. The charging unit 150 may be recharged by power received from an external power supply. Here, the charging unit 150 may be connected to the external power supply in a wired manner to receive power. Alternatively, the charging unit 150 may be connected to the external power supply in a wireless manner to receive power. The charging unit 150 converts and stores the received power. Further, the charging unit 150 may supply power to the elements of the electronic device 100. The charging unit 150 may be disposed on the back side of the device, while the display may be disposed on the front.

The measurement unit 160 collects measured data in the electronic device 100. In this case, the measurement unit 160 may collect the measured data from the surrounding environment of the electronic device 100. Here, the measured data may include activity data and biometry data. For example, the activity data may include at least one of user inactivity, light walking (light active), and/or healthy pace exercise. The biometry data may include at least one of blood sugar level, heart rate (heartbeat), electrocardiogram, sweat, blood pressure, nutrition, sleep, respiratory rate, oxygen saturation, water intake, and/or caffeine intake. The measurement unit 160 may include various types of sensors.

The storage 170 stores data, including operating programs of the electronic device 100. In this case, the storage 170 also stores a plurality of functions. For example, the functions may be applications. Here, the functions include at least a measurement function and, an event management function. Further, the storage unit 170 stores a program for displaying and controlling an event management screen. In addition, the storage unit 170 stores data that is generated while the programs are executed. In this case, the storage unit 170 may store the data based on various types of events. Here, the storage unit 170 may store communication data created in response to a communication event. Further, the storage unit 170 may store measured data in response to a measurement event. In addition, the storage unit 170 may store input data in response to an input event.

The controller 180 controls the overall operation in the electronic device 100. As such, controller 180 performs a plurality of functions. Here, the controller 180 may include a function processor for individual functions. The function processor may substantially process the individual functions. For example, the function processor may be an Application Processor (AP). The controller 180 performs an event management function. The controller 180 creates an event management screen 200 to correspond to the event management function.

The alarm unit 190 generates an alarm signal. Here, the alarm signal may be a light-emitting signal, an audio signal, a vibration signal; and/or a combination of these signals.

FIG. 2 is an example of a watch-like electronic device implemented according to an embodiment of the present disclosure.

In FIG. 2, the controller 180 displays the event management screen 200 through the display unit 120. For example, the controller 180 may display the event management screen 200 as a background screen or a function execution screen. The event management screen 200 may have a circular shape.

The event management screen 200 includes an item area 210, an information area 220, and a pointer 230 which projects from the information area 220 into the item area 210.

The item area 210 is disposed on the edge portion or circumference of the event management screen 200. The item area 210 may be disposed outside the information area 220. In this embodiment, the item area 210 corresponds to a preset period of time. Here, the item area 210 is implemented in a ring shape to surround the information area 220. Further, a reference point or line 211 represents the border between the start point and the end point of the preset time period, i.e., reference line 211 defines both the start and end of the preset time period in the item area 210. The item area 210 displays one or more event items 213 in response to events within the preset period of time. In addition, item area 210 displays items such as emoticon 214.

At least one of the shape and color of an event item may be determined according to the category of its associated event. For example, the shape of an event item may include a block shape and a linear shape. In FIG. 2; at least one of the location and size of the event item 213 in the item area 210 is determined according to the event time of the associated events. The color of an event item may be determined according to the event intensity or other quantifiable quality of the associated event.

The information area 220 is disposed in the center of the event management screen 200. Namely, the information area 220 is disposed inside the item area 210 and the information area 220 is implemented in a circular shape. The pointer 230 is disposed on a side of the item area 210, and points into item area 210, thereby indicating a position, event, event item, etc. in item area 210 on the event management screen 200. In other embodiments, the pointer may be disposed in another orientation and/or position in regards to the item area 210 and the information area 220, as long as the pointer indicates a position within item area 210.

The controller 180 controls the event management screen 200 in response to a rotation input of the rotary unit 140. Namely, the controller 180 moves the pointer 230 in response to the rotation input. In this case, the pointer 230 moves along the edge of the item area 210. More specifically, the pointer 230 moves along the boundary between the item area 210 and the information area 220. Further, the controller 180 displays event information of an event item when the pointer 230 points to the event item.

Figure 3:
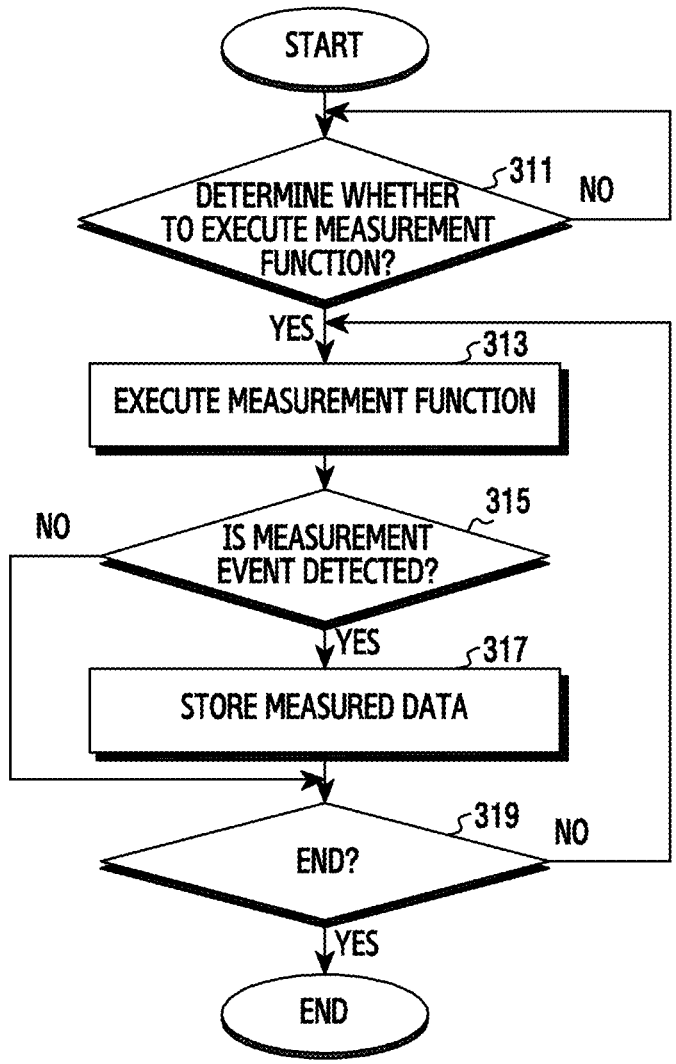
FIG. 3 is a flowchart of a procedure for performing a data storage method according to an embodiment of the present disclosure.

FIG. 3 is a flowchart illustrating a procedure of performing a data storage method according to an embodiment of the present disclosure. As would be understood by one of ordinary skill in the art, the steps below may be performed by one or more controllers and/or processors in the electronic device, even though the steps are described as being performed by controller 180.

Referring to FIG. 3, the data storage method, according to the embodiment of the present disclosure, starts with the controller 180 detecting a request for executing a measurement function in operation 311. A request for executing a measurement function may be made by a user in an almost limitless number of ways, as would be understood by one of ordinary skill in the art.

Next, the controller 180 executes the measurement function in operation 313. Depending on the measurement function, it may be executed one or more times (in the present and/or future) using one or more sensors. In this case, the controller 180 collects measured data from the surrounding environment of the electronic device 100 through the measurement unit 160. To this end, the controller 180 activates at least one of the sensors of the measurement unit 160. Here, the controller 180 may collect activity data through the measurement unit 160. For example, the activity data may include at least one of inactivity, light walking, and healthy pace exercise. Alternatively, the controller 180 may collect measured data at a preset measurement time. Here, the controller 180 may collect biometry data through the measurement unit 160. For example, the biometry data may include at least one of heart rate and sleep. Alternatively, the controller 180 may collect measured data in response to a user input. Here, the controller 180 may collect biometry data through the measurement unit 160; for example, the biometry data may include at least one of water intake and caffeine intake.

Next, whether a measurement event is detected is determined by the controller 180 in step 315. The controller 180 may detect the measurement event when the measured data corresponds to a preset critical range. Alternatively, the controller 180 may detect the measurement event according to the collection of measured data at a preset measurement time. In another case, the controller 180 may detect the measurement event according to the collection of measured data in response to a user input.

If it is determined that a measurement event is detected in step 315, the controller 180 stores the measured data in step 317. Namely, the controller 180 stores the measured data in response to the measurement event. Thereafter, when a request for ending the measurement function is generated, the controller 180 detects the request in step 319. Next, the controller 180 ends the measurement function and ends the data storage method.

If it is determined that a measurement event is not detected in step 315, the process proceeds to step 319. Or, when the request for ending the measurement function is not generated, the process returns to step 313.

In this case, the controller 180 may output an alarm signal in response to the detection of the measurement event. Here, the controller 180 may display a data display screen 400 through the display unit 120. FIGS. 4A through 4D illustrate examples of data display screens 400A-400D which may be displayed on a watch-like electronic device according to an embodiment of the present disclosure, where the displayed data is based on measurement data from measurement events.

For example, when the time period of healthy pace exercise exceeds ten minutes (i.e., the alarm limit), the controller 180 displays the data display screen 400A, as illustrated in FIG. 4A. Alternatively, when the time period of inactivity exceeds fifty minutes, one hour, and two hours, respectively, the controller 180 displays the data display screens 400B1, 400B2, and 400B3, respectively, as illustrated in FIG. 4B. In other words, whenever the inactivity time exceeds the set alarm limit, the controller 180 displays the data display screen 400B. In another case, when the healthy pace exercise ends, the controller 180 displays the data display screen 400C, as illustrated in FIG. 4C. In yet another case, when the inactivity time ends, the controller 180 displays the data display screen 400D, as illustrated in FIG. 4D. Further, the controller 180 may display measured data on the data display screen 400. In addition, the controller 180 may output at least one of a light-emitting signal, an audio signal, and/or a vibration signal when an alarm limit is reached.

Figure 5:
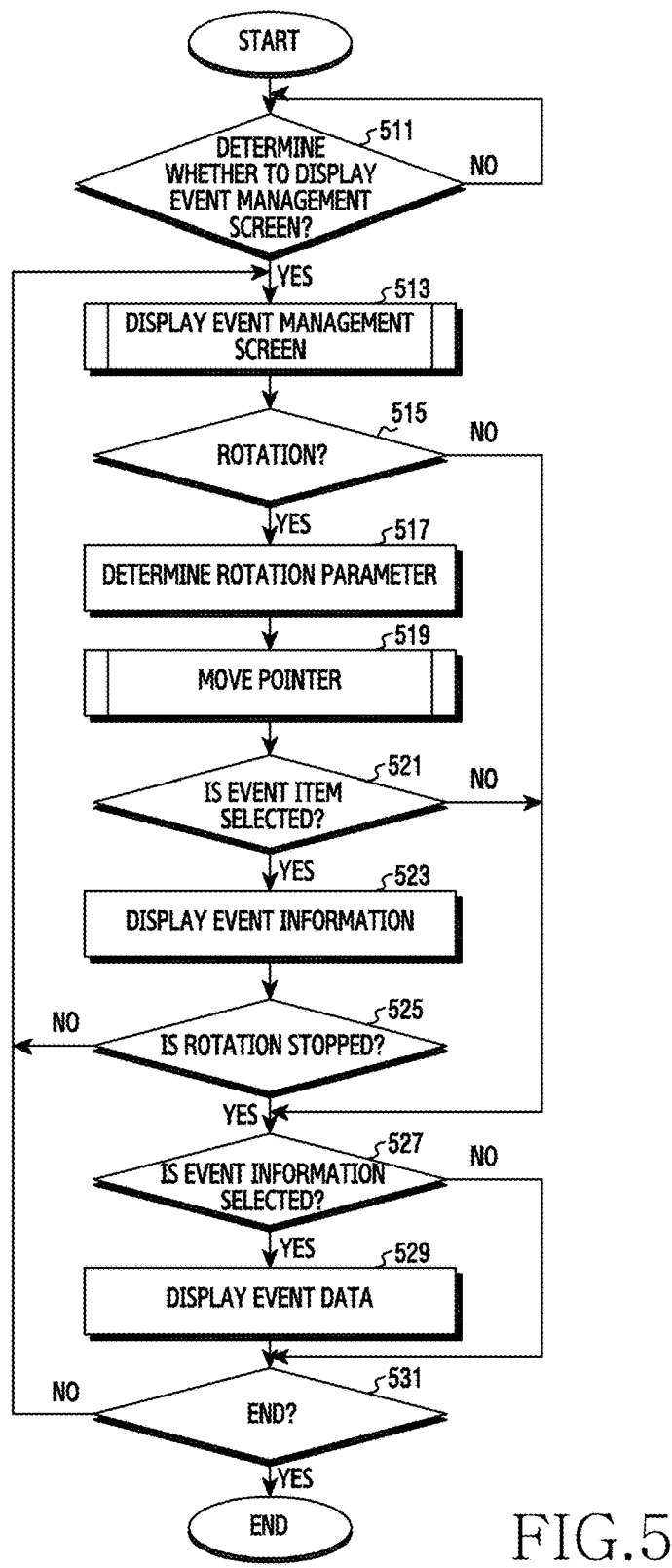
FIG. 5 is a flowchart of an event management screen display method according to an embodiment of the present disclosure.

FIG. 5 is a flowchart of an event management screen display method according to an embodiment of the present disclosure. FIGS. 11 to 19 illustrate examples of screen displays which may be generated during an event management screen display method according to embodiments of the present disclosure.

Figure 12:
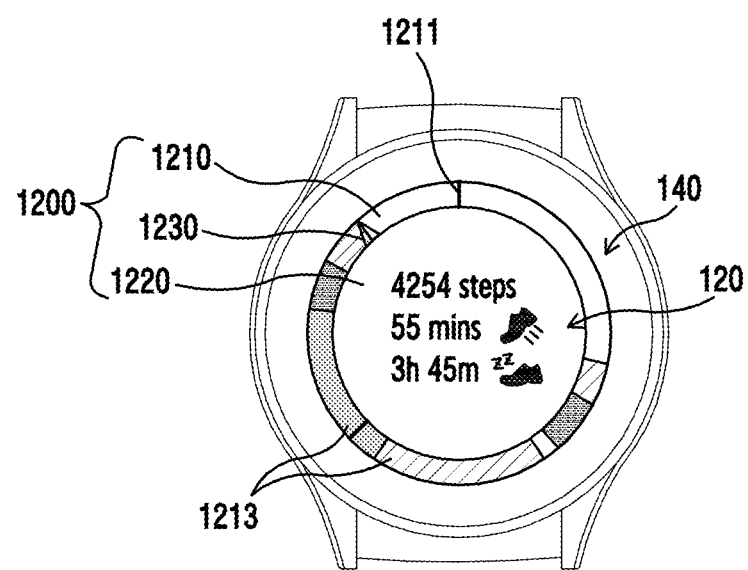

Referring to FIG. 5, the screen display method, according to the embodiment of the present disclosure, starts with the controller 180 detecting a request for displaying an event management screen, such as event management screen 1200 in FIG. 12, in step 511. When a request for executing an event management function is generated, the controller 180 also detects it as the request for displaying the event management screen in step 511. Alternatively, when a preset display time point arrives, the controller 180 may detect it as the request for displaying the event management screen. Here, the controller 180 may detect the end of the preset time period as a display time point. The preset time period may be set to any arbitrary value. For example, the preset time period may be set to one day (i.e., 24 hours).

Next, in step 513, the controller 180 displays the event management screen and the controller 180 performs the event management function. The controller 180 may display the event management screen 1200 on the display unit 120, as shown in FIG. 12.

Figure 11:
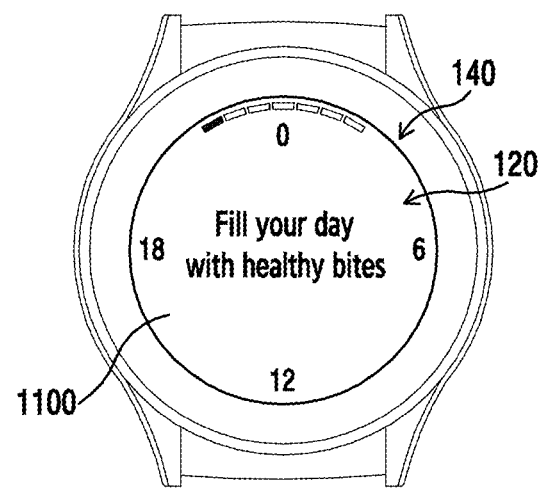

If the event management function is executed for the first time within the preset time period, the controller 180 displays a guide screen 1100 on the display unit 120, as illustrated in FIG. 11. The guide screen 1100 provides a time array (for example, a time line) on the circumference of the event management screen. Thereafter, the controller 180 displays the event management screen 1200 on the display unit 120, as illustrated in FIG. 12. Similarly, if the event management function is not being executed for the first time within the preset time period, the controller 180 displays the event management screen 1200 on the display unit 120, as illustrated in FIG. 12.

As shown in FIG. 12, the event management screen 1200 includes an item area 1210, an information area 1220, and a pointer 1230. The item area 1210 is disposed on the edge portion of the event management screen 1200 outside the information area 1220. Here, the item area 1210 corresponds to the preset time period and the item area 1210 is implemented in a ring shape to surround the information area 1220. Further, a reference point/line 1211 representing the border of the start point and the end point of the preset time period is defined in the item area 1210. The pointer 1230 points to the interior of the item area 1210.

The controller 180 displays one or more event items 1213 in the item area 1210 in response to one or more events within the preset time period of the item area 1210. Further, the controller 180 may display event information of the one or more event items 1213 in the information area 1220. Here, the controller 180 may summarize and display the event information of the one or more event items 1213 in the information area 1220. Specifically, when a plurality of event items 1213 are displayed in the event item area 1210, the controller 180 may add the event information of all the event items 1213 and display the same in the information area 1220. In addition, the controller 180 may display an operating icon corresponding to an operation in the information area 1220. Further, the controller 180 may locate the pointer 1230 to correspond to the current time point within the preset time period of the item area 1210.

In FIG. 12, the controller 180 may display the event management screen 1200 and then switch the event management screen 1200 according to the time point of the time period of the item area 1210. Namely, when pointed at by the pointer 1230 within the item area 1210, the controller 180 displays the event information of the pointed-at event item in the information area 1220. As time passes and pointer 1230 moves on, the controller 180 removes the event information of the previously pointed-at event item from the information area 1220. In this way, the controller 180 may display the event management screen 1200 in response to the current time period.

Figure 6:
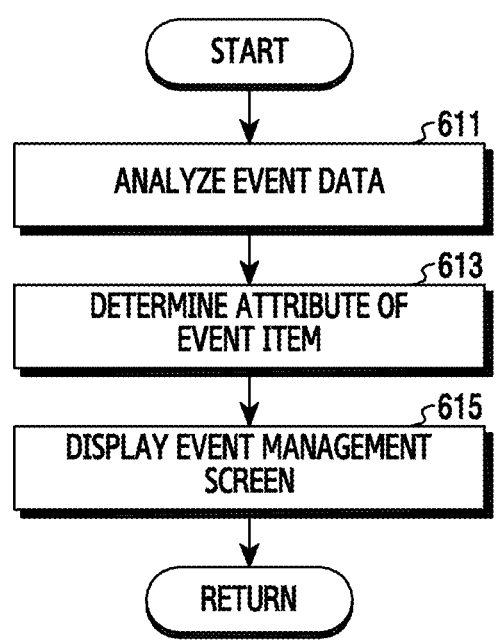
FIG. 6 is a flowchart illustrating an example of a procedure for displaying an event management screen in accordance with an embodiment of the present disclosure.

FIG. 6 is a flowchart illustrating an example of a procedure for displaying an event management screen in accordance with an embodiment of the present disclosure.

Referring to FIG. 6, the controller 180 analyzes event data in step 611. The event may include at least one of communication data, measured data, and/or input data. Here, the communication data refers to data that is transmitted or received through the communication unit 110. For example, the communication data may include a transmission call, a reception call, a transmission message, a reception message, a schedule, an alarm, etc. The measured data refers to data that is measured through the measurement unit 160. The input data refers to data that is input through the input unit 130 or the rotary unit 140. For example, the input data may include a schedule, an alarm, a memo, etc. The event data may include at least one of a category and an event time for each event.

Next, in step 613, the controller 180 determines one or more attributes of the event item 1213. More specifically, the controller 180 determines the one or more attributes of the event item 1213 based on event data. The one or more attributes of the event item 1213 may include at least one of the shape, size, color, and/or location of the event item 1213. Here, the shape of the event item 1213 includes a block shape and a linear shape.

Specifically, the controller 180 may determine at least one of the shape and color of the event item 1213 according to the category of the event. For example, when the category of the event corresponds to general walking, the controller 180 may determine that the shape of the corresponding event item will be a block shape and/or the color of the corresponding event item will be yellow. Alternatively, when the category of the event corresponds to healthy pace exercise, the controller 180 may determine that the shape of the event item will be a block shape and the color of the event item will be green. In another case, when the category of the event corresponds to a schedule, the controller 180 may determine that the shape of the event item will be a block shape and the color of the event item will be brown. In yet another case, when the category of the event corresponds to a heart rate measurement the controller 180 may determine that the shape of the event item will be linear and the color of the event item will be red. In yet another case, when the category of the event corresponds to a reception message, the controller 180 may determine that the shape of the event item will be linear and the color of the event item will be blue.

In addition, the controller 180 may determine at least one of the location and/or size of an event item within the item area 1210 according to the event time of the associated event. Namely, the controller 180 may determine the location of the event item within the item area 1210 according to the event time of the event item. For example, the controller 180 may determine the location of the event item in the item area 1210 according to a ratio of the difference between the start time point of the preset time period and the event time to the difference between the event time and the end time point of the preset time period. Alternatively, the controller 180 may determine the size of the event item according to the event time of the event item. For example, the controller 180 may determine the size of the event item within the item area 1210 according to the ratio of the event time to the total preset time period of the item area 1210.

Moreover, the controller 180 may determine the color of the event item according to the event intensity of the event. For example, when the event intensity of the event corresponds to general walking, the controller 180 may determine the color of the event item to be yellow. Alternatively, when the event intensity of the event corresponds to healthy pace exercise, the controller 180 may determine the color of the event item to be green.

Next, in step 615 of FIG. 6, the controller 180 displays the event management screen. In this case, the controller 180 displays the one or more event items in the item area 1210 of the event management screen 1200. More specifically, the controller 180 displays the one or more event items according to the determined attributes of each of the event items. Here, the controller 180 may superimpose a plurality of event items on each other. For example; the controller 180 may superimpose an event item having a linear shape on an event item having a block shape. Alternatively, the controller 180 may make the event items superimposed on each other according to preset priorities of the events. After step 615, the controller 180 returns to FIG. 5.

Next, if a rotation input is generated, the controller 180 detects the rotation input in step 515.

If a rotation input is detected, the controller 180 determines a rotation parameter in step 517. Namely, the controller 180 determines the rotation parameter from the rotation input of the rotary unit 140. In this case, the rotation parameter may be one or more of the direction, angle, and/or time of the rotation.

Thereafter, the controller 180 moves the pointer 1230 in step 519. In this case, the controller 180 moves the pointer 1230 according to the rotation parameter. As pointer 1230 moves, each event item it passes is selected, which the controller 180 detects as a selection of the event item in step 521.

In step 521, when the pointer 1230 points to a passing event item, the controller 180 detects the selection of the event item. Here, if the shape of the event item is a linear shape, when the pointer 1230 points to the linear event item, the controller 180 selects the linear event item. Alternatively, if the shape of the event item is a block shape, the pointer 1230 points to the midpoint of the block event item so that the block event item may be selected. In this way, when the pointer 1230 points to the midpoint of the block event item, the controller 180 selects the block event item. Furthermore, if a plurality of event items are superimposed on each other, the controller 180 may individually select the event items within the superimposed event items. Alternatively, if a plurality of event items are superimposed on each other, the controller 180 may simultaneously select all of the event items.

Next, in step 523, the controller 180 displays the event information of the event item(s) being pointed at. In this case, the controller 180 displays the event information in the information area 1220. Here, the event information may be extracted from the event data and may be configured with at least a part of the event data.

FIGS. 13A-13G illustrate examples of the event information displayed in information area 1220 changing according to the location of the pointer 1230 within item area 1210. Namely, the controller 180 changes the event information of the information area 1220 in response to the rotation input. Here, the controller 180 may display the event information for each passing event item in a slideshow format in the information area 1220.

Next, if the rotation input stops, the controller 180 detects the stop of the rotation input in step 525. In this case, when the rotation input is stopped by the rotary unit 140, the controller 180 detects the stop of the rotation input.

If the rotation has stopped in step 525, or if no rotation is detected in step 515, the controller 180 detects whether there is the selection of the event information in step 527. In this case, when the information area 1220 is touched, the controller 180 detects the selection of the event information. Alternatively, when pressure input data is generated on the rotary unit 140 while the event information is being displayed, the controller 180 detects the selection of the event information. In another case, as time passes after the event information is displayed, the controller 180 detects the selection of the event information. Namely, after a certain period of time passes without a rotation input, the controller 180 detects this inaction as the selection of the event information.

If the displayed event information is selected in step 527 or no rotation input is detected in step 515, the controller 180 displays associated event data in step 529. In this case, the controller 180 displays the event data in the information area 1220.

Figure 14A:
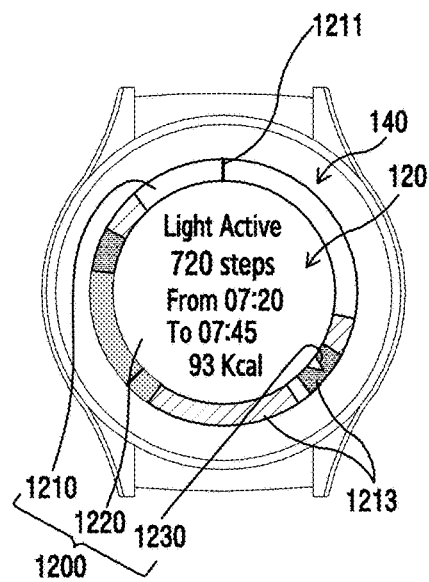
Figure 14B:
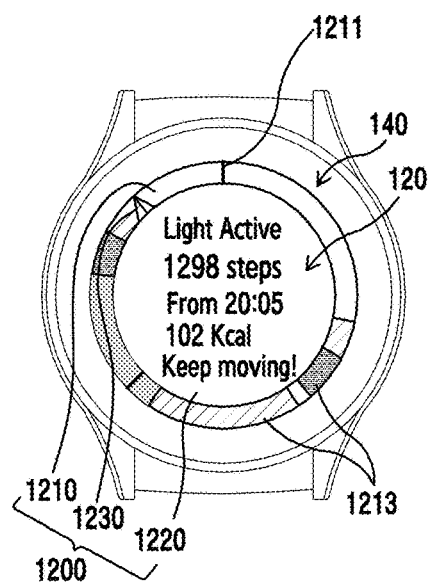

FIGS. 14A-14B illustrate examples of displaying event data. Specifically, the controller 180 may display the event data in response to an event at the current time point, as illustrated in FIG. 14A. In an embodiment where the pointer progresses with the current time, the controller 180 may continually update the event data. Accordingly, the controller 180 may be continually updating the event data in the information area 1220. In addition, the controller 180 may display a preset text in the information area 1220 corresponding to the event data/information. For example, the controller 180 may add the text "get moving" in response to inactivity; "keep moving" in response to light walking; and "keep this pace" in response to healthy pace exercise. Alternatively, when the selection of the event information is detected in step 527 after the rotation input stops in step 525, the controller 180 may display the event data, as illustrated in FIG. 14B.

In step 531, if a request for ending the event management function is generated, the controller 180 detects the request. The controller 180 ends the event management function and ends the event management screen display method.

If the rotation input does not stop in step 525, the controller 180 may repeat at least some of steps 513 to 525. Alternatively, if the request for ending the event management function is not detected in step 531, the controller 180 may repeat at least some of steps 513 to 531. Here, when a preset time period passes after the event information or the event data is displayed in the information area 1220, the controller 180 may return to step 513. Namely, the controller 180 may summarize and display the event information of all the event items in the information area 1220. Specifically, when a plurality of event items are displayed in the event item area 1210, the controller 180 may add the event information of the event items and may display the same in the information area 1220. In some embodiments, the controller 180 may locate the pointer 1230 to correspond to the current time point within the preset time period of the item area 1210.

Figure 7:
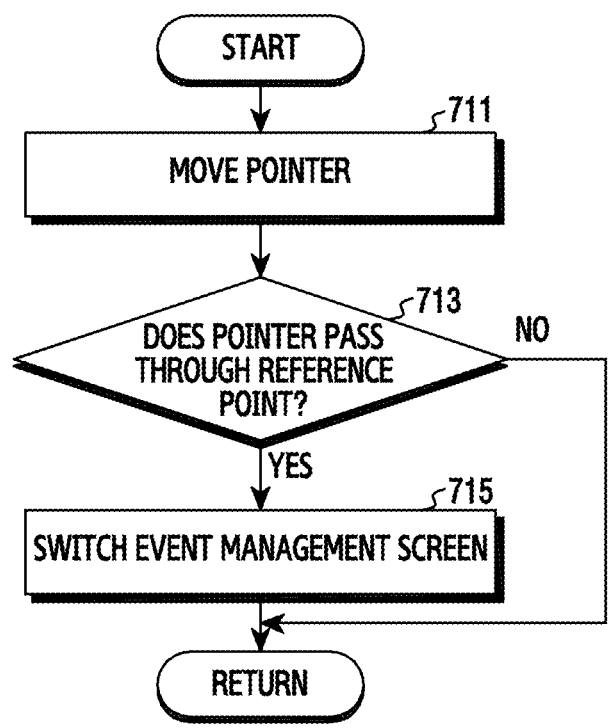
FIG. 7 is a flowchart illustrating a first example of a procedure for moving a pointer in accordance with an embodiment of the present disclosure.

FIG. 7 is a flowchart illustrating a first example of a procedure for moving a pointer in accordance with an embodiment of the present disclosure.

Referring to FIG. 7, the controller 180 moves the pointer 1230 in step 711. In this case, the controller 180 moves the pointer 1230 according to the rotation parameter. Here, the rotation parameter may include the direction, angle, and/or time of rotation.

Figure 15:
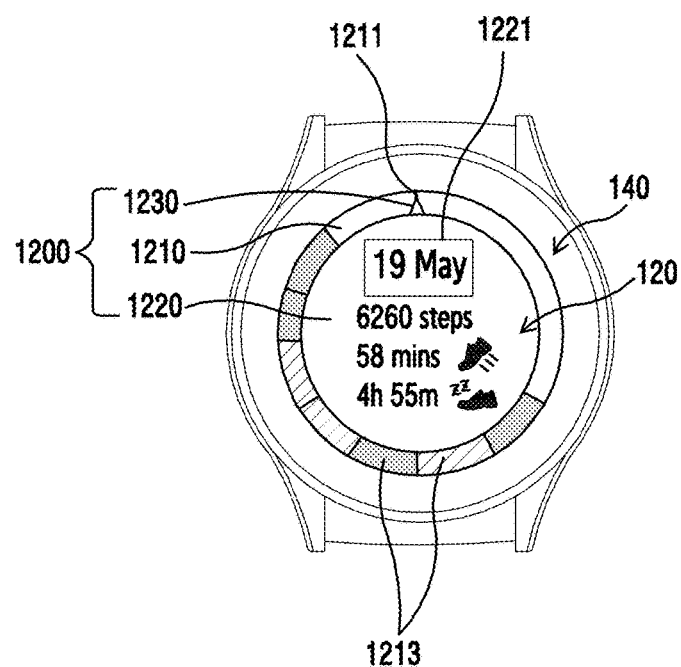

Next, when the pointer 1230 passes through the reference point 1211 of the item area 1210, the controller 180 detects it in step 713. If the pointer 1230 passes through the reference point 1211, the controller 180 switches the event management screen 1200 in step 715. In this embodiment, the controller 180 switches the event management screen 1200 based on the direction of rotation. Here, the controller 180 may display the event management screen 1200 to correspond to the previous time period, or the next time period, based on the current time period depending on the direction of rotation. For example, the time period may be set to one day (i.e., 24 hours). Further, when the direction of rotation corresponds to the counterclockwise direction, the controller 180 displays the event management screen 1200 to correspond to the previous date. In like manner, when the direction of rotation corresponds to the clockwise direction, the controller 180 displays the event management screen 1200 to correspond to the next date. For example, the controller 180 may display the event management screen 1200, as illustrated in FIG. 15.

Figure 8:
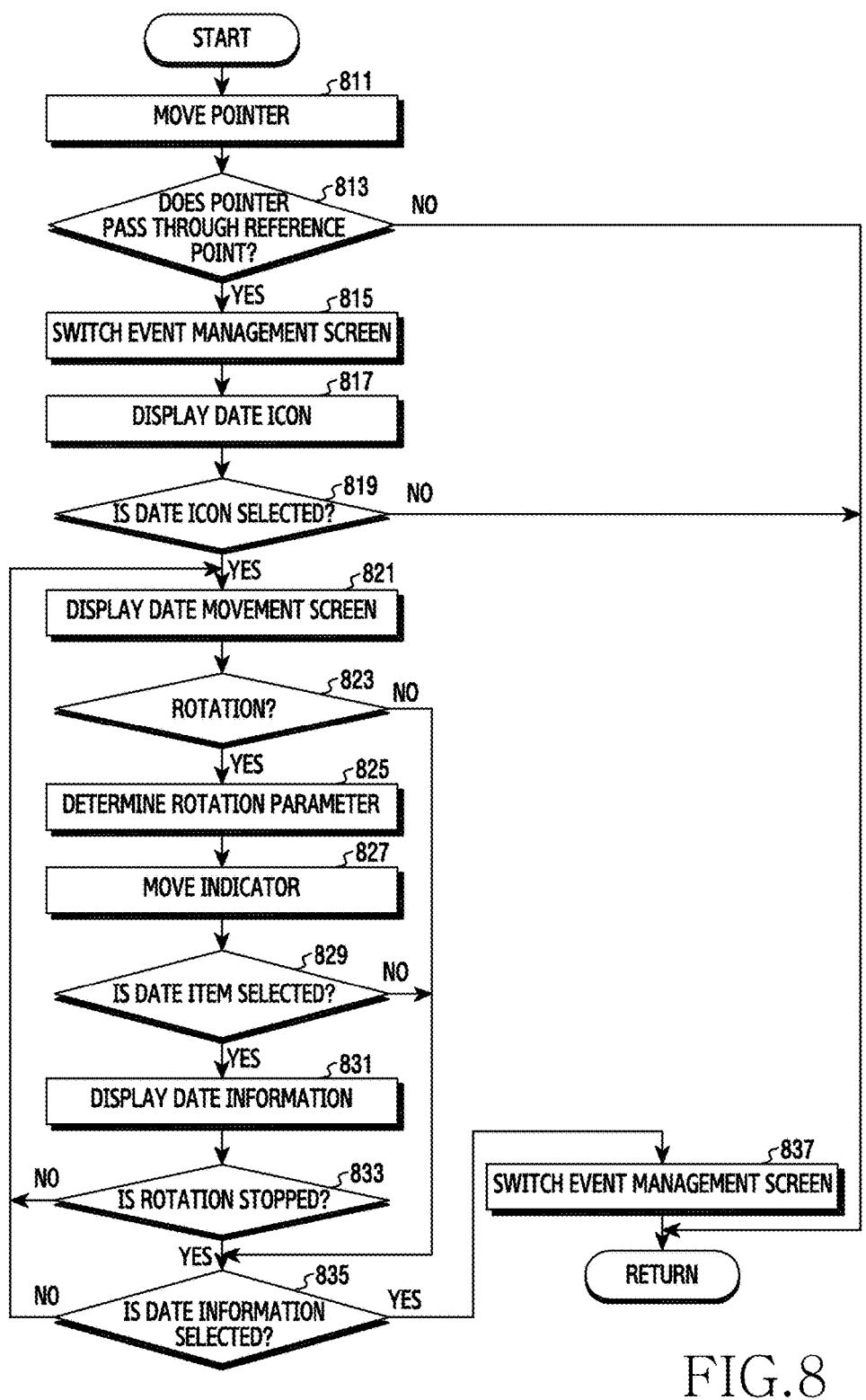
FIG. 8 is a flowchart illustrating a second example of a procedure for moving a pointer in accordance with an embodiment of the present disclosure.

FIG. 8 is a flowchart illustrating a second example of a procedure for moving a pointer in accordance with an embodiment of the present disclosure.

Referring to FIG. 8, the controller 180 moves the pointer 1230 in step 811. In this case, the controller 180 moves the pointer 1230 according to the rotation parameter. Here, the rotation parameter may include the direction, angle, and time of rotation.

Next, if the pointer 1230 passes through the reference point 1211 of the item area 1210, the controller 180 detects it in step 813. If the pointer 1230 passes through the reference point 1211, the controller 180 switches the event management screen 1200 in step 815. The event management screen 1200 may switch in a number of ways, as discussed in reference to step 713 in FIG. 7.

In step 817, the controller 180 displays a date icon 1221, as illustrated in FIG. 15. In this case, the controller 180 displays the date icon 1221 in the information area 1220.

Next, the controller 180 detects whether there is a selection of the date icon 1221 in step 819. In this case, when the date icon 1221 in the information area 1220 is touched, the controller 180 detects this as the selection of the date icon 1221. Thereafter, the controller 180 displays a date movement screen 1700 in step 821, as illustrated in FIG. 17.

Figure 16:
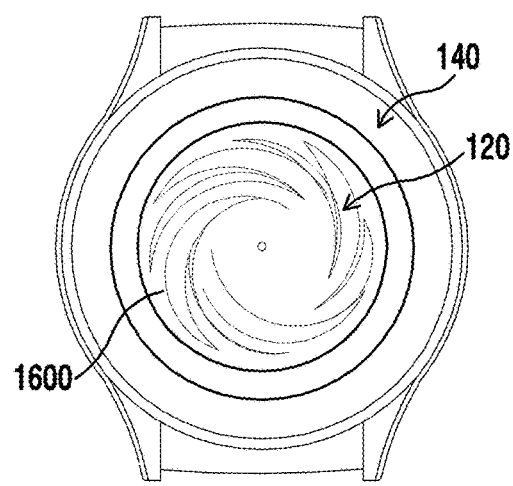

In one embodiment, when the date icon 1221 is selected, the controller 180 first displays a movement detection screen 1600, as illustrated in FIG. 16. The movement detection screen 1600 is displayed during the switching from the event management screen 1200 to the date movement screen 1700. Thereafter, the controller 180 displays the date movement screen 1700 on the display unit 120, as illustrated in FIG. 17. Alternatively, when the date icon 1221 is selected, the controller 180 may promptly display the date movement screen 1700 on the display unit 120, as illustrated in FIG. 17.

Figure 17:
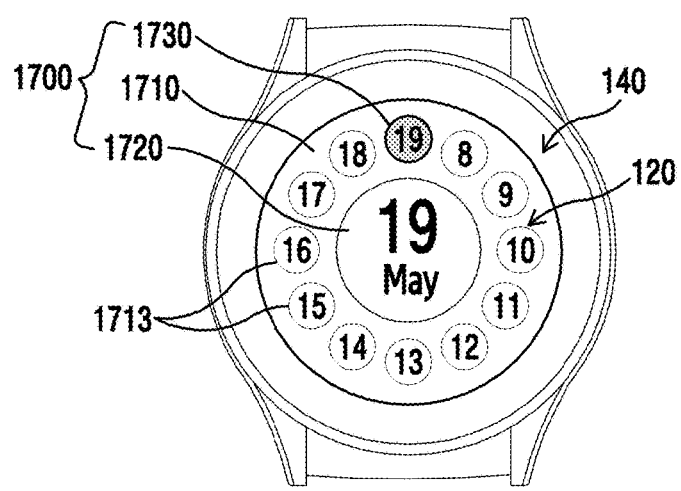

As shown in FIG. 17, the date movement screen 1700 includes an item area 1710, an information area 1720, and an indicator 1730. The ring-shaped item area 1710 is disposed similarly to item area 1210, on the edge portion of the date movement screen 1700 surrounding the information area 1720, which is disposed in the center of the date movement screen 1700.

The controller 180 displays a plurality of date items 1713 in the item area 1710. Here, the controller 180 allocates different dates to the date items. Further, the controller 180 locates the indicator 1730 on one of the date items. For example, the controller 180 may locate the indicator 1730 to correspond to the current date. In addition, the controller 180 may display date information of one of the date items 1713 in the information area 1720. Here, the controller 180 displays the date information corresponding to the location of the indicator 1730.

Figure 18:
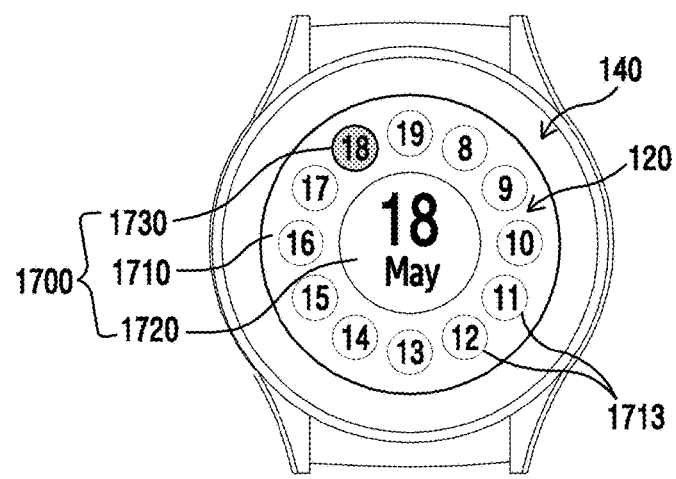

Returning to FIG. 8, after step 821, if a rotation input is generated, the controller 180 detects the rotation input in step 823. In this case, when the rotation input is generated through the rotary unit 140, the controller 180 may detect the same. The controller 180 determines a rotation parameter in step 825. Namely, the controller 180 determines the rotation parameter from the rotation input of the rotary unit 140. In this case, the rotation parameter may include the direction, angle, and time of rotation. Thereafter, the controller 180 moves the indicator 1730 in step 827. In this case, the controller 180 moves the indicator 1730 according to the rotation parameter. Here, the controller 180 may move the indicator 1730 to another date item, as illustrated in FIG. 18. Namely, the controller 180 may move the indicator 1730 between date items in the item area 1710.

Next, if one of the date items is selected, the controller 180 detects the selection of the date item in step 829. In this case, if the indicator 1730 is located on one of the date items, the controller 180 selects the pointed-at one of the date items. Thereafter, the controller 180 displays date information in step 831. In this case, the controller 180 displays the date information of the selected date item in the information area 1720. For example, in FIG. 18, the controller 180 displays the date information according to the location of the indicator 1730 in the item area 1710. Namely, the controller 180 changes the date information of the information area 1720 in response to the rotation input. Here, the controller 180 may display the date information for each passing date item in a slideshow format in the information area 1720.

Next, the controller 180 detects whether the rotation input has stopped in step 833. In this case, when the rotation input of the rotary unit 140 stops, the controller 180 detects this stoppage as the rotation input having stopped.

If the rotation has stopped, the controller 180 detects whether there is a selection of the date information in step 835. In this case, when the information area 1720 is touched, the controller 180 detects the touch as the selection of the date information. The controller 180 switches the event management screen 1200 in step 837. In this case, the controller 180 switches the event management screen 1200 based on the date information. Namely, the controller 180 displays the event management screen 1200 to correspond to the date contained in the selected date information.

If the rotation input does not stop in step 833, the controller 180 may repeat at least some of steps 821 to 833. Alternatively, if the date information is not selected in step 835, the controller 180 may repeat at least some of steps 821 to 835.

Figure 9:
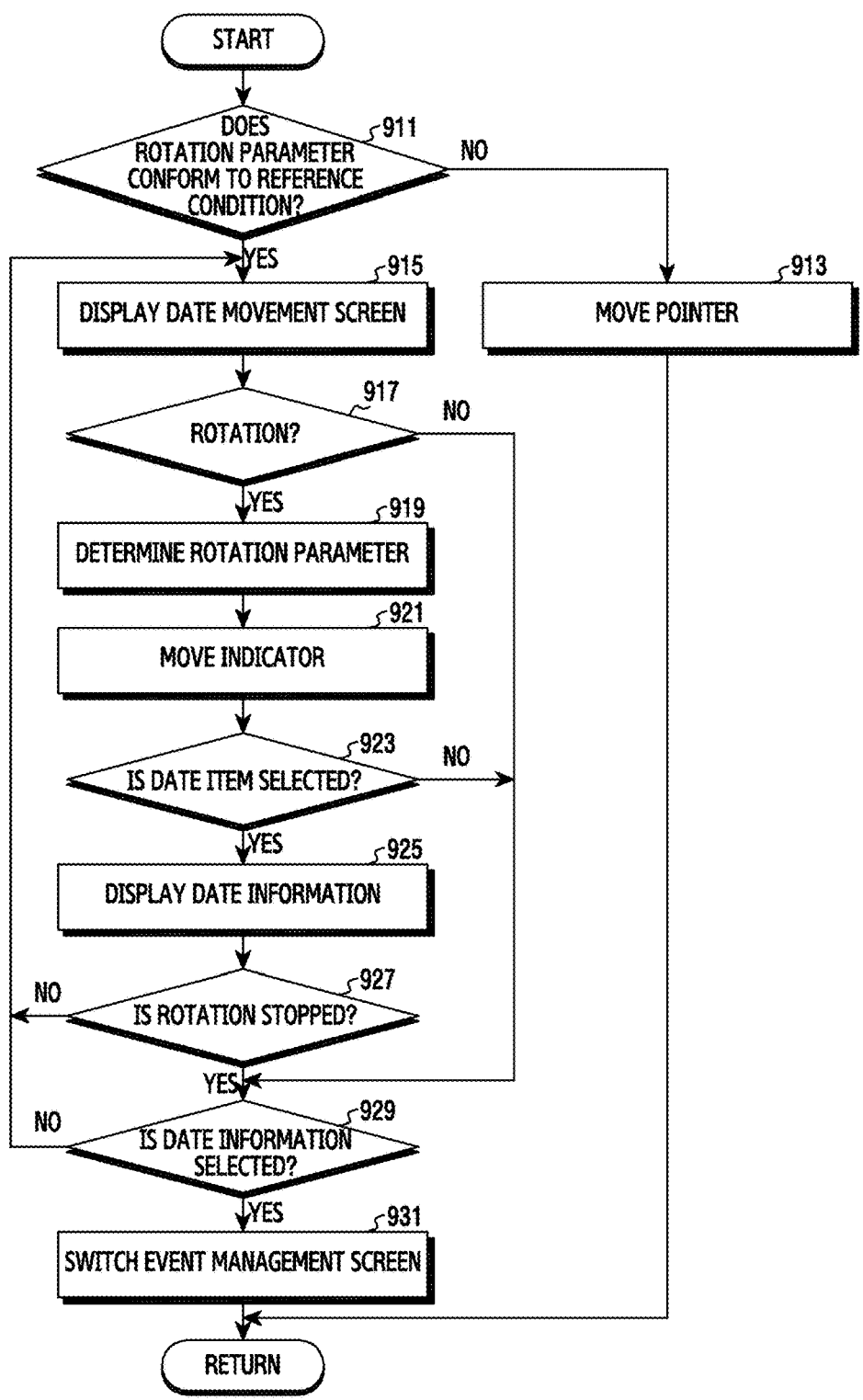
FIG. 9 is a flowchart illustrating a third example of a procedure for moving a pointer in accordance with an embodiment of the present disclosure.

FIG. 9 is a flowchart illustrating a third example of a procedure for moving a pointer in accordance with an embodiment of the present disclosure.

Referring to FIG. 9, in step 911, the controller 180 determines whether the rotation parameter conforms to a reference condition. The reference condition may be associated with at least one of the direction, angle, and time of rotation. The reference condition may also be a combination of conditions. For example, the reference condition may be movement in the counterclockwise direction, for one revolution, and within one second or less. In other words, the reference condition may correspond to the rotary unit 140 making one revolution in the counterclockwise direction within a second. Accordingly, if the rotation parameter(s) are the counterclockwise direction, one revolution, and two seconds, the controller 180 determines that the rotation parameter does not conform to the reference condition. Alternatively, if the rotation parameters are the counterclockwise direction, one revolution, and 0.9 seconds, the controller 180 determines that the rotation parameter conforms to the reference condition.

Next, if it is determined in step 911 that the rotation parameter does not conform to the reference condition, the controller 180 moves the pointer 1230 in step 913. In this case, the controller 180 moves the pointer 1230 according to the rotation parameter.

If it is determined in step 911 that the rotation parameter conforms to the reference condition, the controller 180 displays a date movement screen in step 915. In this case, the controller 180 displays the date movement screen 1700 on the display unit 120. Depending on the embodiment, when the date icon 1221 is selected, the controller 180 may display a movement detection screen 1600 on the display unit 120, as illustrated in FIG. 16. The movement detection screen 1600 may be displayed while switching from the event management screen 1200 to the date movement screen 1700.

Next, if a rotation input is generated, the controller 180 detects the rotation input in step 917. In this case, when the rotation input is generated through the rotary unit 140, the controller 180 detects it as the rotation input. The controller 180 determines a rotation parameter in step 919. Namely, the controller 180 determines the rotation parameter from the rotation input of the rotary unit 140. After the rotation parameter is determined, the controller 180 moves the indicator 1730 in step 921. In this case, the controller 180 moves the indicator 1730 according to the rotation parameter. Here, the controller 180 may move the indicator 1730, as illustrated in FIG. 18. Namely, the controller 180 may move the indicator 1730 between date items in the item area 1710.

Next, if one of the date items is selected, the controller 180 detects the selection in step 923. In this case, if the indicator 1730 is located on one of the date items, the controller 180 selects the one of the date items on which the indicator 1730 is located. If a date item is selected, the controller 180 displays date information in step 925. In this case, the controller 180 displays the date information in the information area 1720. Namely, the controller 180 displays the date information which corresponds to the one of the date items on which the indicator 1730 is located. FIG. 18 illustrates an example where the controller 180 displays the date information according to the location of the indicator 1730 in the item area 1710. Namely, the controller 180 changes the date information of the information area 1720 in response to the rotation input. Here, the controller 180 may display the date information for each date item in a slide-show format in the information area 1720.

Next, if the rotation input stops, the controller 180 detects the stop of the rotation input in step 927. In this case, when the rotation input is stopped by the rotary unit 140, the controller 180 detects that stoppage as the stop of the rotation input. Next, the controller 180 detects whether there is a selection of the date information in step 929. In this case, when the information area 1720 is touched, the controller 180 detects this touch as the selection of the date information. The controller 180 switches the event management screen 1200 in step 931. In this case, the controller 180 switches the event management screen 1200 based on the date information. Namely, the controller 180 displays the event management screen to correspond to the date contained in the selected date information.

If the rotation input does not stop in step 927, the controller 180 may repeat at least some of steps 915 to 927. Alternatively, if the date information is not selected in step 929, the controller 180 may repeat at least some of steps 915 to 929.

Figure 10:
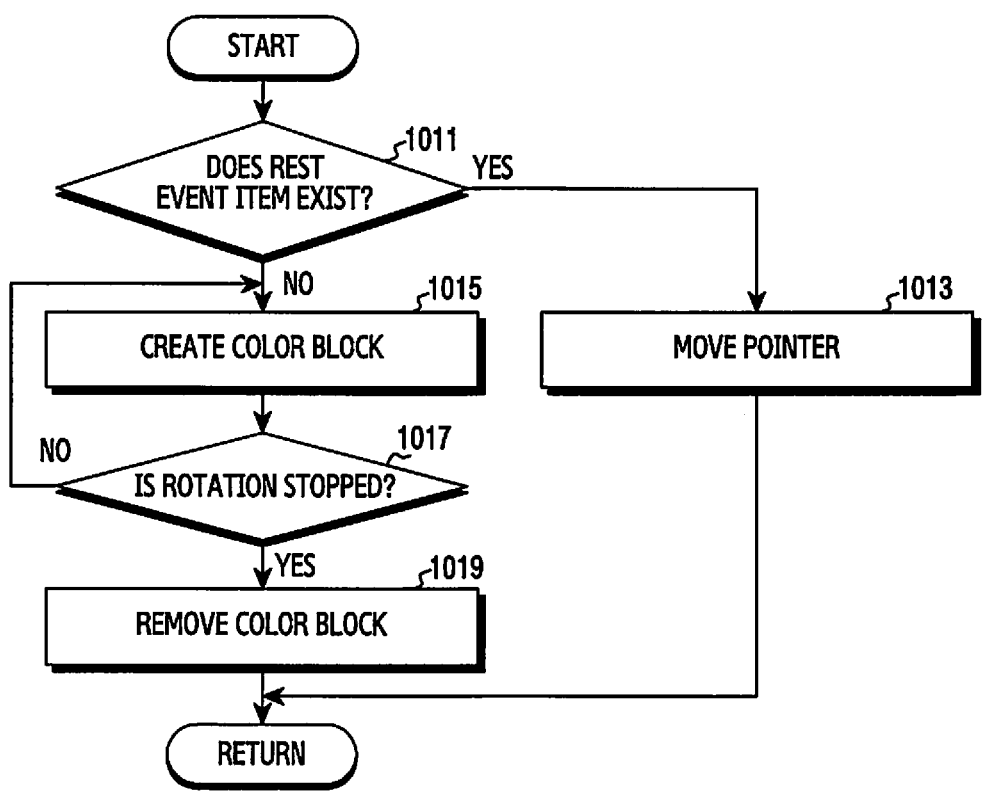
FIG. 10 is a flowchart illustrating a fourth example of a procedure for moving a pointer in accordance with an embodiment of the present disclosure.

FIG. 10 is a flowchart illustrating a fourth example of a procedure for moving a pointer in accordance with an embodiment of the present disclosure.

Referring to FIG. 10, in step 1011, the controller 180 determines whether a rest event item exists. In this case, based on the rotation parameter, the controller 180 determines whether a rest event item to be pointed by the pointer 1230 exists next to the pointer in the direction of rotation. If it is determined in step 1011 that a rest event item exists, the controller 180 moves the pointer 1230 in step 1013. In this case, the controller 180 moves the pointer 1230 according to the rotation parameter.

Figure 19A:
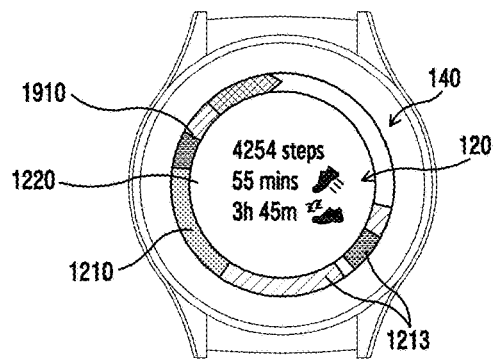
Figure 19B:
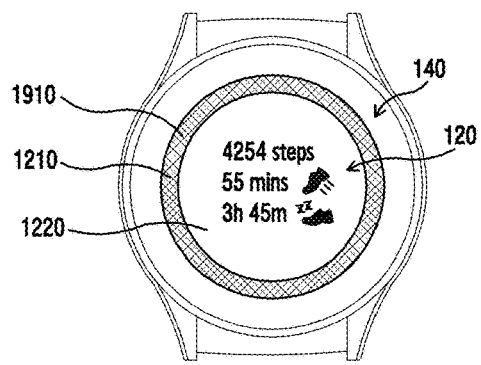

If it is determined in step 1011 that a rest event item does not exist, the controller 180 creates a color block in step 1015. In this case, the controller 180 may create the color block 1910 in the item area 1210, as illustrated in FIGS. 19A-19B. The controller 180 creates the color block based on the rotation parameter. Here, the rotation parameter may include the direction, angle, and/or time of rotation. For example, the controller 180 may create the color block based on the location of the pointer 1230. Further, the controller 180 may extend the color block based on the rotation parameter. Specifically, the controller 180 may extend the color block according to the direction of rotation. Furthermore, the controller 180 may extend the color block according to the angle and time of rotation. For example, the controller 180 may create the color block 1910, as illustrated in FIG. 19A. Moreover, the controller 180 may extend the color block 1910, as illustrated in FIG. 19B.

Next, if the rotation input stops, the controller 180 detects the stop of the rotation input in step 1017. In this case, if the rotation input is stopped by the rotary unit 140, the controller 180 detects this stoppage as the stop of the rotation input. The controller 180 removes the color block in step 1019. In this case, the controller 180 may remove the color block based on the rotation parameter. Namely, the controller 180 may reduce the color block according to the item area 1210. Further, the controller 180 may remove the color block from the item area 1210. Specifically, the controller 180 may reduce the color block in the direction opposite to the direction of rotation. In addition, the controller 180 may reduce the color block according to the angle and time of rotation.

Figure 19C:
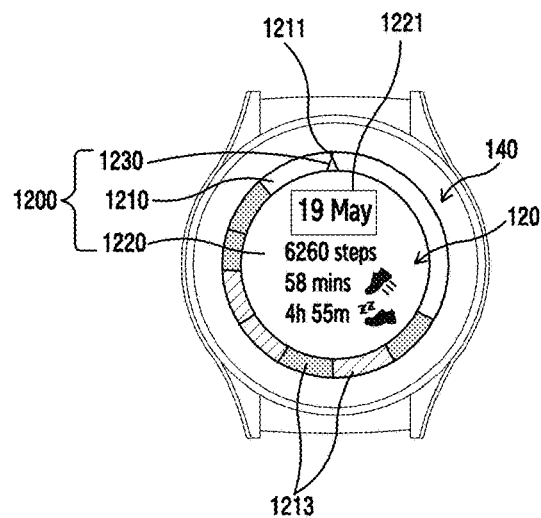

In one embodiment, the controller 180 may move the pointer 1230 in the direction opposite to the direction of rotation after removing the color block. In this case, the controller 180 may move the pointer 1230 based on the rotation parameter. Specifically, the controller 180 may move the pointer 1230 in the direction opposite to the direction of rotation. Further, the controller 180 may move the pointer 1230 according to the angle and time of rotation. Here, the controller 180 may display the event information for each event item in a slideshow format in the information area 1220. For example, the controller 180 may display the event management screen 1200, as illustrated in FIG. 19C.

According to the present disclosure, an electronic device can display event items corresponding to events, which are generated within a predetermined time period, on event management screens according to the event time of the event items. Moreover, the electronic device can simultaneously provide a large number of event items. This enables the user of the electronic device to more easily identify multiple events.

Furthermore, an electronic device according to the present disclosure allows the user to move the pointer between event items according to a rotation input. Due to this, the user of the electronic device can easily use the event management screen. In one embodiment, the electronic device includes a rotary unit for rotation input so that the user of the electronic device can easily control the event management screens. Accordingly, even though the display may be implemented in a small size in the electronic device, the user of the electronic device can easily control the event management screens using the rotary unit.

Therefore, the efficiency and convenience of the electronic device can be enhanced for the user.

The embodiments of the present disclosure shown and described in this specification and the drawings are specific examples presented in order to easily explain technical contents of the present disclosure, and to help comprehension of the present disclosure, but are not intended to limit the scope of the present disclosure in any way. It would be obvious to those skilled in the art that different modifications can be made based on the present disclosure. Therefore, the scope of the present disclosure is defined not by the detailed description of the present disclosure but by the appended claims and their equivalents, and all differences within their scope will be construed as being included in the present disclosure.

What is claimed is:

1. A method for a display of an electronic device, comprising:
   displaying a screen that comprises an information area, an item area disposed at the edge of the information area, and a pointer configured to point within the item area, wherein the item area is configured to display a plurality of event items;
   moving the pointer based on a rotation input; and
   displaying event information associated with an event item to which the pointer points among the plurality of event items, in the information area,
   wherein two or more event items among the plurality of event items are superimposed on each other,
   wherein displaying of the screen comprises:
   determining an attribute of each of the plurality of event items based on event data of a corresponding event item among the plurality of event items; and
   displaying each of the plurality of event items in the item area according to the attribute of the corresponding event item among the plurality of event items,
   wherein the event data of the corresponding event item comprises a category and an event time, and
   wherein determining the attribute of the corresponding event item comprises:
   determining at least one of a shape and a color of the corresponding event item according to the category in the event data; and
   determining a size of the corresponding event item and a location of the corresponding event item in the item area according to the event time in the event data.

2. The method of claim 1, wherein the item area corresponds to a preset time period, and
   wherein the location of the corresponding event item in the item area is determined according to the event time of the corresponding event item within the preset time period.

3. The method of claim 2, wherein the item area is implemented in a ring shape surrounding the information area, and
   wherein a reference point representing both a start point and an end point of the preset time period is disposed in the item area.

4. The method of claim 2, wherein displaying the screen comprises:
   displaying event information of the plurality of event items in the information area when the end of the preset time period arrives; and
   removing the plurality of event items and the event information from the screen after a certain period of time passes.

5. The method of claim 1, wherein the pointer is disposed on, and moves along, a boundary between the information area and the item area.

6. The method of claim 1, wherein moving the pointer comprises:
   determining a rotation parameter from the rotation input, wherein the rotation parameter comprises at least one of a rotation direction, a rotation angle, and a rotation time; and
   moving the pointer according to the rotation parameter.

7. The method of claim 1, further comprising:
   determining, based on the rotation input, whether a rest event item to be pointed by the pointer exists next to the pointer in a rotation direction of the rotation input;
   extending a color block in the item area when the rest event item does not exist; and
   reducing the color block in the item area when the rotation input stops.

8. The method of claim 1, further comprising:
   displaying event data corresponding to the event information in the information area when the event information is selected.

9. An electronic device comprising:
   a display configured to display a screen that comprises an information area, an item area at the edge of the information area, and a pointer configured to point within the item area, wherein the item area is configured to display a plurality of event items;
   a rotary unit rotatably coupled to an edge of the display; and
   a controller configured to:
   determine an attribute of each of the plurality of event items based on event data of a corresponding event item among the plurality of event items, control the display to display each of the plurality of event items in the item area according to the attribute of the corresponding event item among the plurality of event items, control the display to move the pointer based on a rotation input of the rotary unit, and display event information associated with an event item to which the pointer points among the plurality of event items, in the information area, wherein two or more event items among the plurality of event items are superimposed on each other, wherein the event data of the corresponding event item comprises a category and an event time, and wherein the controller is further configured to:

determine at least one of a shape and a color of the corresponding event item according to the category in the event data, and determine a size of the corresponding event item and a location of the corresponding event item in the item area according to the event time in the event data.

10. The electronic device of claim 9, wherein the item area corresponds to a preset time period, and wherein the location of the corresponding event item in the item area is determined according to the event time of the corresponding event item within the preset time period.

11. The electronic device of claim 10, wherein the item area is implemented in a ring shape surrounding the information area, and wherein a reference point representing both a start point and an end point of the preset time period is disposed in the item area.

12. The electronic device of claim 9, wherein the pointer is disposed on, and moves along, a boundary between the information area and the item area.

13. The electronic device of claim 9, wherein the controller is further configured to:

determine a rotation parameter from the rotation input, wherein the rotation parameter comprises at least one of a rotation direction, a rotation angle, and a rotation time, and move the pointer according to the rotation parameter.

14. The electronic device of claim 9, wherein the controller is further configured to:

determine, based on the rotation input, whether a rest event item to be pointed by the pointer exists next to the pointer in the direction of rotation of the rotation input, extend a color block in the item area when the rest event item does not exist; and reduces the color block in the item area when the rotation input stops.

15. The electronic device of claim 9, wherein the controller is further configured to:

control to display event data corresponding to the event information in the information area when the event information is selected.

* * * * *